(12) United States Patent
Taylor

(10) Patent No.: US 9,755,408 B2
(45) Date of Patent: Sep. 5, 2017

(54) ROTATABLE AWNING WITH ROTATING CONDUCTOR

(71) Applicant: DOMETIC CORPORATION, Louisville, KY (US)

(72) Inventor: Brent Alan Taylor, Auburn, IN (US)

(73) Assignee: Dometic Corporation, Louisville, KY (US)

( * ) Notice: Subject to any disclaimer, the term of this patent is extended or adjusted under 35 U.S.C. 154(b) by 0 days.

(21) Appl. No.: 14/984,484

(22) Filed: Dec. 30, 2015

(65) Prior Publication Data

US 2016/0111862 A1 Apr. 21, 2016

Related U.S. Application Data

(63) Continuation of application No. 14/278,036, filed on May 15, 2014, now Pat. No. 9,228,359.

(51) Int. Cl.
| | | |
|---|---|---|
| *E04F 10/06* | (2006.01) | |
| *H02G 3/04* | (2006.01) | |
| *E06B 9/72* | (2006.01) | |
| *E04H 15/10* | (2006.01) | |
| *E04H 15/58* | (2006.01) | |
| *E06B 9/68* | (2006.01) | |

(52) U.S. Cl.
CPC ........ *H02G 3/0406* (2013.01); *E04F 10/0614* (2013.01); *E04F 10/0648* (2013.01); *E04F 10/0666* (2013.01); *E04H 15/10* (2013.01); *E04H 15/58* (2013.01); *E06B 9/72* (2013.01); *E04F 10/0625* (2013.01); *E06B 9/68* (2013.01)

(58) Field of Classification Search
CPC ........... E06B 9/72; E06B 9/68; E04F 10/0648
USPC .................................................. 160/310, 66
See application file for complete search history.

(56) References Cited

U.S. PATENT DOCUMENTS

| | | | | |
|---|---|---|---|---|
| 3,847,171 A | * | 11/1974 | Akers | ..................... B60P 3/343 135/140 |
| 3,955,611 A | * | 5/1976 | Coles | ..................... B60P 3/343 160/243 |
| 4,159,162 A | * | 6/1979 | Christoffel | ............. G03B 21/58 160/24 |
| 4,190,309 A | | 2/1980 | Glass | |
| 4,417,185 A | * | 11/1983 | Bullat | ....................... E06B 9/74 160/1 |
| 4,446,506 A | * | 5/1984 | Larson | ................... G03B 15/02 362/17 |

(Continued)

FOREIGN PATENT DOCUMENTS

| | | |
|---|---|---|
| AU | 366561 | 1/2016 |
| AU | 366562 | 1/2016 |

(Continued)

OTHER PUBLICATIONS

Transmittal Letter of Related Cases dated Mar. 27, 2017.

(Continued)

*Primary Examiner* — Katherine Mitchell
*Assistant Examiner* — Johnnie A Shablack
(74) *Attorney, Agent, or Firm* — Middleton Reutlinger

(57) ABSTRACT

Various embodiments of a rotatable awning with illumination are provided. The awning includes an axial groove wherein a plurality of luminaires are located for lighting of an area below and around an extended awning. The awning includes an electromechanical rotatable conductor which provides electrical contact between a fixed portion of the awning assembly and the rotating awning roller tube. This allows for flow through of electricity or current to the luminaires and/or the awning motor internally through the roller tube.

16 Claims, 10 Drawing Sheets

(56) References Cited

U.S. PATENT DOCUMENTS

| | | | |
|---|---|---|---|
| 4,615,371 A * | 10/1986 | Clauss | E04F 10/0648 160/22 |
| 4,657,462 A | 4/1987 | Hoen | |
| 4,807,684 A * | 2/1989 | Melton | E06B 9/17046 160/133 |
| 4,822,292 A | 4/1989 | Thayer et al. | |
| 5,010,940 A * | 4/1991 | Marocco | E06B 9/36 160/168.1 R |
| 5,148,849 A * | 9/1992 | Faludy | B60P 3/343 160/10 |
| 5,180,223 A * | 1/1993 | McNamee | B60Q 1/305 362/223 |
| 5,197,797 A * | 3/1993 | Jaksich | F21V 15/013 362/219 |
| 5,259,774 A | 11/1993 | Gabrius | |
| 5,577,830 A | 11/1996 | Barry | |
| 5,760,558 A * | 6/1998 | Popat | E06B 9/32 160/168.1 R |
| 5,793,174 A * | 8/1998 | Kovach | E06B 9/262 318/16 |
| 5,853,294 A | 12/1998 | Rehder | |
| 5,934,349 A | 8/1999 | Faller | |
| 5,984,687 A | 11/1999 | Schwarz | |
| 6,230,785 B1 * | 5/2001 | Tokuyama | E06B 9/88 160/133 |
| 6,273,172 B1 * | 8/2001 | Frey | E04F 10/0614 135/88.12 |
| 6,353,178 B1 | 3/2002 | Linhart | |
| 6,421,175 B1 * | 7/2002 | Shopp | G03B 21/58 160/310 |
| 6,489,702 B1 | 12/2002 | Bartman | |
| 6,494,246 B1 * | 12/2002 | Blevins | E04F 10/0614 135/88.12 |
| 6,692,135 B2 | 2/2004 | Li | |
| 6,700,246 B1 * | 3/2004 | Bruhn | E06B 9/72 192/12 BA |
| 6,837,255 B2 | 1/2005 | Bunch et al. | |
| 6,843,301 B2 * | 1/2005 | Carrillo | E04F 10/0614 160/310 |
| 6,983,783 B2 * | 1/2006 | Carmen, Jr. | E06B 9/68 160/120 |
| 7,057,360 B1 * | 6/2006 | Hsu | E06B 9/72 318/105 |
| 7,061,197 B1 * | 6/2006 | Mullet | E05F 15/668 318/466 |
| 7,066,618 B1 | 6/2006 | Little | |
| 7,105,858 B2 * | 9/2006 | Popovich | D03D 1/0088 257/680 |
| 7,281,560 B2 * | 10/2007 | Hicks | E04F 10/0614 160/67 |
| 7,311,290 B1 | 12/2007 | Barnes | |
| 7,387,483 B1 | 6/2008 | Scheurn | |
| 7,387,514 B2 | 6/2008 | Bienert | |
| 7,604,015 B2 | 10/2009 | Fraser | |
| 7,723,939 B2 * | 5/2010 | Carmen, Jr. | E06B 9/40 318/16 |
| 7,748,675 B2 | 7/2010 | Nestor et al. | |
| 7,819,665 B1 | 10/2010 | Nishizawa | |
| 7,821,479 B2 * | 10/2010 | Zhang | G09F 9/33 345/110 |
| 7,861,990 B2 | 1/2011 | Barnes | |
| 7,871,017 B2 * | 1/2011 | Van Zutven | A01G 9/22 160/22 |
| 7,883,247 B2 | 2/2011 | Calleja | |
| 7,890,765 B2 | 2/2011 | Zhang et al. | |
| 7,914,198 B2 | 3/2011 | Mier-Langner et al. | |
| 8,258,993 B2 * | 9/2012 | Inoue | E06B 9/72 160/310 |
| 8,287,284 B1 | 10/2012 | Nishizawa | |
| 8,348,677 B2 | 1/2013 | Angerpointner et al. | |
| 8,368,328 B2 * | 2/2013 | Mullet | E06B 9/42 160/133 |
| 8,376,757 B2 | 2/2013 | Yamamoto et al. | |
| 8,418,741 B2 * | 4/2013 | Cheung | E06B 9/42 160/241 |
| 8,506,136 B1 | 8/2013 | Herdt | |
| 8,708,877 B2 * | 4/2014 | Kirihara | E06B 9/72 492/15 |
| 8,723,454 B2 * | 5/2014 | Skinner | E06B 9/322 318/16 |
| 8,776,861 B2 * | 7/2014 | Bohlen | E06B 9/62 160/189 |
| 8,887,785 B2 * | 11/2014 | Goth | E04F 10/0614 160/66 |
| 8,950,460 B2 * | 2/2015 | Worthman | E04F 10/0614 160/10 |
| 8,960,260 B2 * | 2/2015 | Anderson | E06B 9/72 160/310 |
| 9,091,118 B2 * | 7/2015 | Anderson | E06B 9/72 |
| 9,228,359 B2 * | 1/2016 | Taylor | E04F 10/0648 |
| 9,394,743 B2 * | 7/2016 | Mullet | E06B 9/40 |
| 2004/0020611 A1 * | 2/2004 | Coenraets | E06B 9/13 160/188 |
| 2004/0041743 A1 * | 3/2004 | Ling | G09F 9/33 345/1.1 |
| 2004/0129849 A1 * | 7/2004 | Walker | E06B 9/72 248/266 |
| 2005/0039861 A1 | 2/2005 | Faludy et al. | |
| 2006/0158045 A1 * | 7/2006 | Speri | E06B 9/72 310/1 |
| 2007/0039911 A1 * | 2/2007 | Sator | A47B 81/005 211/68 |
| 2008/0093030 A1 * | 4/2008 | Gutierrez | E04F 10/0625 160/67 |
| 2008/0128095 A1 | 6/2008 | Van Zutven | |
| 2008/0163989 A1 * | 7/2008 | Sales | E06B 9/70 160/310 |
| 2008/0173341 A1 | 7/2008 | Falin | |
| 2008/0192492 A1 | 8/2008 | Chen | |
| 2008/0230192 A1 * | 9/2008 | Kane | E06B 9/40 160/311 |
| 2010/0061093 A1 | 3/2010 | Janssen et al. | |
| 2010/0194785 A1 * | 8/2010 | Huitema | G02F 1/133305 345/690 |
| 2010/0307701 A1 * | 12/2010 | Peterson | E06B 9/72 160/310 |
| 2011/0048651 A1 | 3/2011 | Goth | |
| 2011/0048655 A1 * | 3/2011 | Andreasen | E06B 9/72 160/310 |
| 2012/0073624 A1 * | 3/2012 | Nocito | E04F 10/0633 136/245 |
| 2013/0235558 A1 * | 9/2013 | Zhou | B05B 1/202 362/96 |
| 2014/0110065 A1 * | 4/2014 | Beland | B60P 3/343 160/66 |
| 2014/0142436 A1 * | 5/2014 | Hutchins | A61B 5/0035 600/478 |
| 2014/0224437 A1 * | 8/2014 | Colson | E06B 9/42 160/291 |
| 2014/0262058 A1 * | 9/2014 | Mullet | E06B 9/42 160/7 |
| 2014/0305602 A1 * | 10/2014 | Kirby | E06B 9/42 160/310 |
| 2015/0034259 A1 * | 2/2015 | Bohlen | E06B 9/42 160/310 |
| 2015/0179994 A1 * | 6/2015 | Lemaitre | E06B 9/72 160/310 |
| 2015/0330086 A1 * | 11/2015 | Taylor | E04F 10/0648 160/69 |
| 2015/0330087 A1 * | 11/2015 | Taylor | E04F 10/0659 160/69 |
| 2016/0230460 A1 * | 8/2016 | Colson | E06B 9/42 |

FOREIGN PATENT DOCUMENTS

| | | |
|---|---|---|
| BE | 1016946 | 10/2007 |
| CA | 165362 | 6/2016 |
| CA | 165363 | 6/2016 |
| CH | DE 102010054920 A1 * | 6/2011 ........... H02K 7/1025 |

(56) References Cited

FOREIGN PATENT DOCUMENTS

| | | | |
|---|---|---|---|
| CN | 103147585 | 6/2013 | |
| DE | 102010054920 | 6/2011 | |
| DE | 202011051085 | 11/2011 | |
| DE | 202011051105 | 11/2011 | |
| EP | 0916781 | 7/2001 | |
| EP | 1396592 | 3/2004 | |
| EP | 1484459 | 12/2004 | |
| EP | 1785544 | 1/2008 | |
| EP | 002861385 | 11/2015 | |
| EP | 002861393 | 11/2015 | |
| FR | 2808047 | 10/2001 | |
| GB | 2205888 | 12/1988 | |
| GR | 1003642 | 8/2001 | |
| JP | 06267327 | 9/1994 | |
| JP | 2008337118 | 12/1996 | |
| KR | 101065173 | 9/2011 | |
| KR | 101224491 | 1/2013 | |
| KR | 101284733 | 7/2013 | |
| WO | 9518898 | 7/1995 | |
| WO | 9735146 | 9/1997 | |
| WO | 2006056348 | 6/2006 | |
| WO | 2013129916 | 9/2013 | |
| WO | WO 2013129916 A1 * | 9/2013 | ............... E06B 9/62 |

OTHER PUBLICATIONS

Korean Intellectual Property Office, International Search Report and Written Opinion for PCT/US15/031206 Aug. 24, 2015.

Larson Enterprises "Awna-Roll"; Valley Center, CA [PowerPoint Presentation], 21 pages Jan. 1, 2000.

Welcome to a World of Relaxation Right in Your Backyard, Retractable Awnings, Retractable Window, Patio and Porch Awning Features at http://www.aristocratawnings.com/awnings/retractable-awnings; 5 pages Dec. 28, 2013.

RV Outfitters, Awnings, Awning Accessories Online Catalog at http://www.bellrpg.net/Rvout/RV/group.asp; 11 pages Dec. 28, 2013.

Eclipse Lunar Light Package; Retractable Awnings, Retractable Shades and Solar Shades by Eclipse Awning at http://www.eclipseawning.com/home/products/accessories; eclipse-lunar-light-package; 3 pages Dec. 28, 2013.

Korean Intellectual Property Office, International Search Report and Written Opinion for PCT/US15/031175 Aug. 12, 2015.

Korean Intellectual Property Office, International Search Report and Written Opinion of PCT Serial No. PCT/US15/031182 dated Aug. 24, 2015.

LED Light Kit 18-21; Introduction, Description and Price of product at http://www.rvawningsmart.com/LED-Light-Kit-13-21-68205.htm Nov. 14, 2013.

Carefree Thin-Lite Awning Roller Light; Introduction and Description of product at http://www.carefreeofcolorado.com/carefree/products; 2 pages. Nov. 14, 2013.

Canadian Patent Application No. 2,948,559 entitled "Rotatable Awning with Illumination" filed Nov. 8, 2016.

Australian Patent Application No. 2015258913 entitled "Rotatable Awning with Illumination" filed Nov. 8, 2016.

Canadian Patent Application No. 2,948,854 entitled "Power Track Awning Assembly" filed Nov. 10, 2016.

European Patent Application No. 15 793 333.4 entitled "Power Track Awning Assembly" filed Dec. 8, 2016.

U.S. Appl. No. 15/311,110 entitled "Power Track Awning Assembly", filed Nov. 14, 2016.

Canadian Patent Application No. 2,948,856 entitled "Power Track Assembly and Accessory Base Therefore", filed Nov. 10, 2016.

European Patent Application No. 15 793 465.4 entitled "Power Track Assembly and Accessory Base Therefore", filed Dec. 13, 2016.

U.S. Appl. No. 15/311,131 entitled "Power Track Assembly and Accessory Base Therefore", filed Nov. 14, 2016.

Canadian Intellectual Property Office, Office Action for Canadian Patent Application No. 2,948,559 dated Dec. 16, 2016.

Design U.S. Appl. No. 29/527,180 entitled "Accessory Base", filed May 15, 2015.

Design U.S. Appl. No. 29/527,177 entitled "Accessory Base", filed May 15, 2015.

United States Patent and Trademark Office, Office Action for U.S. Appl. No. 14/278,036 dated Apr. 14, 2015.

* cited by examiner

ROTATABLE AWNING WITH ROTATING CONDUCTOR

CLAIM TO PRIORITY

This Continuation Application claims priority under 35 U.S.C. §120 to U.S. Non-Provisional application Ser. No. 14/278,036, filed May 15, 2015, titled "Rotatable Awning with Illumination", which is hereby incorporated by reference.

STATEMENT REGARDING FEDERALLY SPONSORED RESEARCH

None.

REFERENCE TO SEQUENTIAL LISTING, ETC

None.

BACKGROUND

Field of the Invention

Present embodiments generally pertain to an awning with a rotatable roller tube. More particularly, present embodiments relate to, without limitation, a rotatable awning roller tube with a conductor assembly allowing rotation of the awning tube while maintaining electrical connection through the rotating joint.

Description of the Related Art

Various attempts have been made to provide lighting underneath an extended awning. Some attempts have included lighting which depends from hardware supporting the canopy. However, problems have been various, including how to route wiring to the lighting for power. Recent awnings have utilized a wire in hem arrangement which requires the wiring to wrap around the awning tube with the awning. However, while motor sizing and or current loads requires that wires be of minimum size, the wiring size can create problems in wrapping and or storage of the awning.

In order to overcome this problem, some designs have utilized wiring that may be of smaller than desirable gauge. However, this may not be a desirable solution as undersized wiring may create hazardous conditions.

Accordingly, it would be desirable to overcome these and other deficiencies in known awning assemblies. It would be desirable to provide illumination under the shaded area of the awning wherein the illumination structure provided in the awning roller tube need not be removed or deconstructed from the awning during retraction of the awning. More particularly, it would be desirable to provide a structure which allows for electrical communication independent of the awning hem paths previously utilized. It would be desirable to provide a structure that allows for electrical communication to the rotating structure which precludes winding of wires or binding associated therewith.

The information included in this Background section of the specification, including any references cited herein and any description or discussion thereof, is included for technical reference purposes only and is not to be regarded subject matter by which the scope of the invention is to be bound.

SUMMARY

According to some embodiments, a rotatable awning with illumination structure is provided. The awning includes an illumination assembly located along an axial groove formed in a roller tube. Wiring is provided internally through the roller tube and extends to a rotatable conductor allowing electrical communication between the fixed structure of the awning and the rotating roller tube.

According to some embodiments, a rotating conductor assembly comprises a rotatable conductor having an outer bushing and an inner bushing, the outer bushing having a first conductor and a second conductor, a first brush in electrical communication with the first conductor and a second brush in electrical communication with the second conductor, the inner bushing disposed within the outer bushing, wherein the inner bushing has third and fourth conductors in electrical communication with electrical conductor rings, the first and second brushes in rotating electrical communication with the electrical conductor rings. Further, one of the inner and outer bushings rotates relative to the other of the inner and outer bushings, an awning having a torsion rod extending from one of a first end and a second end toward the other of a first end and a second end, an awning roller tube extending co-axially with the rod, the awning roller tube having an axial groove including a luminaire therein, and the inner bushing engaging one of the rod and the awning roller tube, the outer bushing engaging one of the awning roller tube and an end cap.

Optionally, the rotating conductor assembly may further comprise a protuberance extending from the rotating conductor. A protuberance extends from the flange and the protuberance may engage the end cap or may engage the interior of the awning roller tube. The rotating conductor assembly may further comprise a drive assembly coupled to the inner bushing. Electricity may be transferred across the rotating conductor assembly to the luminaire. The outer bushing may comprise a first body and a second body. The outer bushing may be rotatable relative to the inner bushing. The awning roller tube may have an opening near an axial end to allow a conductor to pass from interior of the awning roller tube to exterior of the awning roller tube. The opening may be in the end cap. An axial groove may extend a length of the awning roller tube. Alternatively, the axial groove may have a length which is less than a length of the awning roller tube.

According to another embodiment, a rotating conductor assembly for an awning assembly comprises an awning drive assembly including a motor, drive for driving a roller tube at one of a first end and a second end and the roller tube, a torsion assembly at the other of said first end and said second end of the roller tube, a rotating conductor disposed at one end of the roller tube, the rotating conductor allowing transfer of electricity across a rotating connection, the rotating conductor having an outer bushing and an inner bushing providing rotation, at least one conducting wire extending from the outer bushing and at least one conductor wire extending from the inner bushing, one of the outer bushing and the inner bushing having at least one conducting brush and the other of the outer bushing and the inner bushing having a conducting ring engaged by the at least one conducting brush and provide electrical communication during rotation of one the awning roller tube, and, the roller tube having at least one groove including at least one luminaire therein.

Optionally, the torsion assembly may include an end cap and the end cap may engage the outer bushing. The outer bushing may have at least one protuberance engaging the end cap. Alternatively, the outer bushing may have at least one protuberance engaging the awning roller tube.

According to still further embodiments, a rotatable conductor assembly for an awning comprises an awning assembly including an awning roller tube, a rotating conductor connected to the awning assembly, the rotating conductor allowing an electrical connection between a fixed portion of the awning assembly and the rotating awning roller tube, first electrical wiring extending through hardware of the awning assembly to a fixed portion of said rotating conductor, and, second electrical wiring extending from a rotating portion of said rotating conductor to a luminaire in said awning roller tube.

All of the above outlined features are to be understood as exemplary only and many more features and objectives of the rotatable awning with illumination may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the rotatable awning with illumination will now be described by way of examples. These embodiments are not to limit the scope of the claims as other embodiments of the rotatable awning with illumination will become apparent to one having ordinary skill in the art upon reading the instant description. Non-limiting examples of the present embodiments are shown in figures wherein:

DETAILED DESCRIPTION

Figure 1:
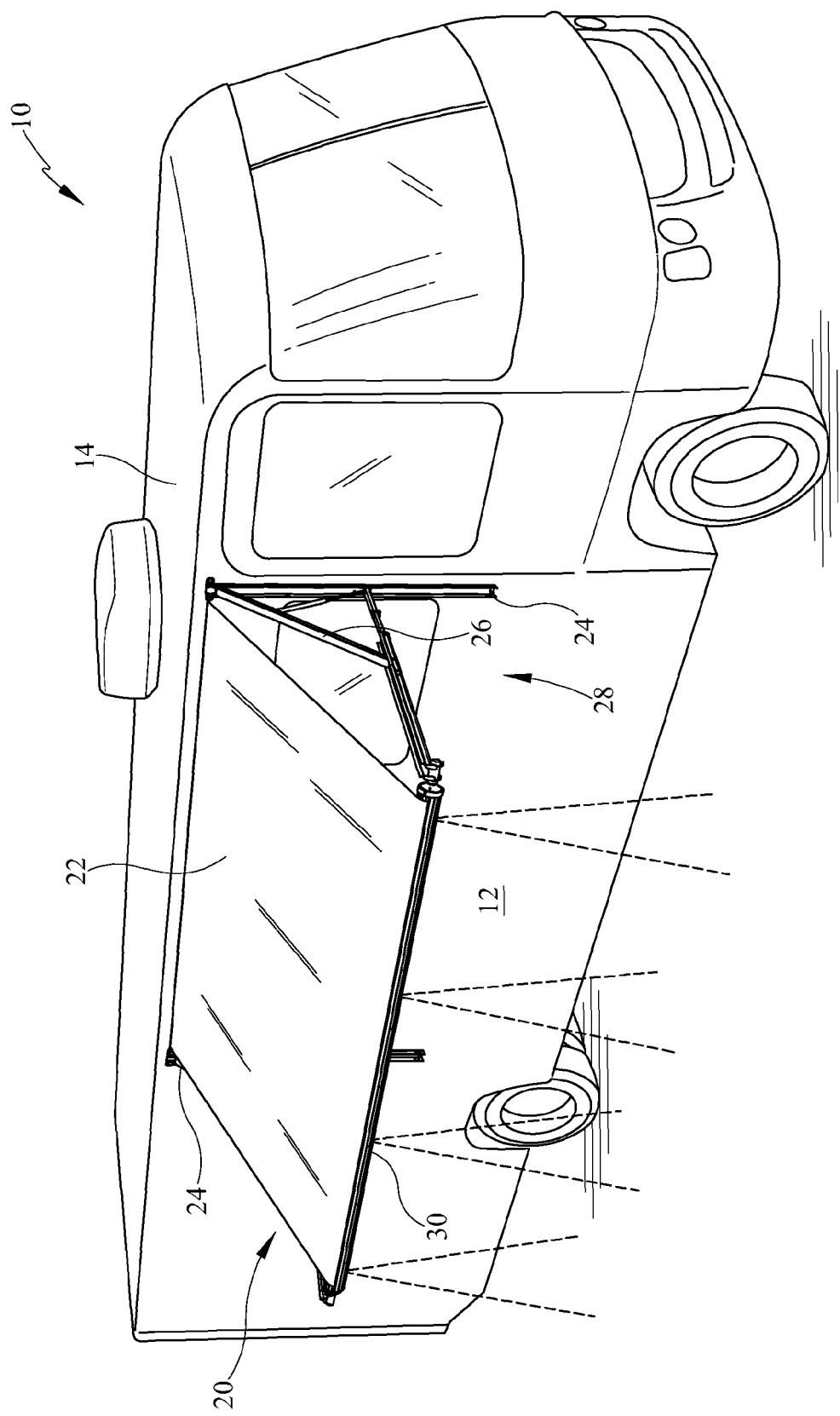
FIG. 1 is an isometric view of a recreational vehicle having a rotatable awning with illumination.

It is to be understood that the rotatable awning with illumination is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-10 various embodiments of a rotatable awning with illumination. The awning includes an axial groove wherein a plurality of luminaires are located for lighting of an area below and around an extended awning. The awning includes an electromechanical rotatable conductor which provides electrical contact between a fixed portion of the awning roller assembly and the rotating awning roller tube. This allows for flow through of electricity or current to the luminaires and/or the awning motor internally through the roller tube.

Referring now to FIG. 1, an isometric view of a recreational vehicle 10 is depicted. The RV includes a drive and transmission, not shown, as well as a sidewall 12 and a roof 14. It should be understood that although an RV is referred to in the exemplary embodiments, one skilled in the art should understand that the use of the awning with lighting is not limited to these vehicles. The awnings may be used with towable structures, sometimes called campers, homes and other stationary structures as well as boats or other marine applications for example which use canopy structures which may or may not be retractable, commercial vehicles, agricultural vehicles, horse trailers, and temporary structures such as those used at sports events, (tailgating), flea markets. All of these structures are considered to be forms of recreational vehicles (RVs) or structures which may be used with an awning.

An awning assembly 20 is connected to the sidewall 12 and/or the roof 14 of the vehicle 10. In further embodiments, the awning assembly 20 may be retractable within the sidewall so as to reduce the airflow interference of the assembly while the vehicle 10 is being operated.

The awning assembly 20 includes an awning or canopy 22 and hardware assembly 28 defined by at least one first arm 24 and at least one second arm 26. The hardware assembly 28 may be utilized at lateral ends of the awning 22 according to some embodiments. The present embodiment utilizes three arms but varying hardware configurations may be utilized. The awning hardware assembly 28, which is utilized according to the instant embodiment to connect the awning assembly 20 to the sidewall 12 of the vehicle. The hardware assembly 28 allows for support of the canopy 22 in an extended position (shown) or in a retracted position. The awning assembly 20 is exemplary and other variations may be utilized. The awning assembly 20 further includes a roller tube assembly 30 which extends between the hardware assemblies 28 and which moves inwardly and outwardly with corresponding retraction or extension of the canopy 22 to provide the sheltered or shaded area beneath the awning assembly 20. The awning assembly 20 may be a manually operated assembly requiring manual rotation to extend or retract the canopy 22. Alternatively, the awning assembly 20 may be an automated system such as by electrical, air, hydraulic or other fluid power systems to cause extension or retraction of the canopy 22. Additionally, the awning may be fixed at the wall 12 so that the opposite edge is extended and retracted.

Figure 2:
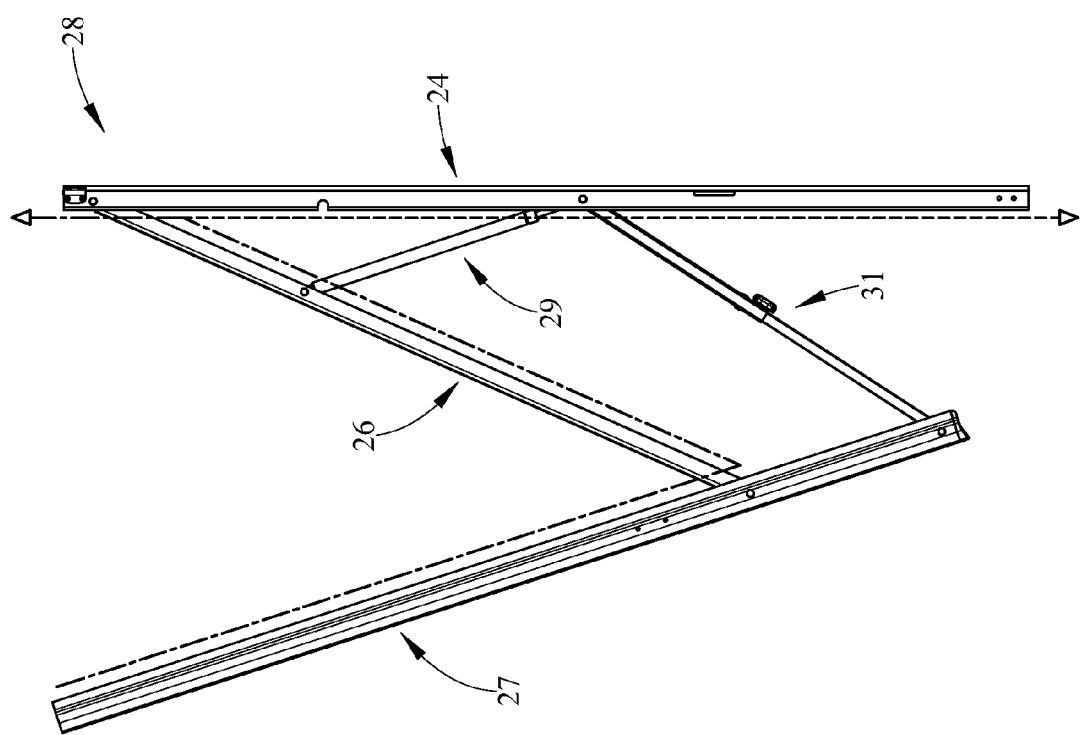
FIG. 2 is a side view of an exemplary hardware assembly used with the rotatable awning with illumination of FIG. 1.

Referring now to FIG. 2, a side view of the awning hardware assembly 28 is depicted. The assembly 28 includes a first arm 24 which is mounted to a sidewall, for example sidewall 12 of the embodiment shown in FIG. 1. The second arm 26 extends from the first arm 24. In the exemplary embodiment, the second arm 26 may extend from the upper end, however this is not limiting and merely one example of a configuration which may be utilized. The second arm 26 is pivotally connected to the first arm 24 and may be further sized so as to be nested in a nested arrangement with either or both of the first arm 24 and a third arm 27 which may be pivotally connected to an opposite end of the second arm 26 and spaced from the first arm 24. One or more struts 29 may be utilized to control movement of the second and third arms 26, 27. Additionally, a locking structure 31 may be utilized to position and adjust the extended configuration of the awning hardware assembly 28.

As shown in broken line extending parallel to the second and third arms 26, 27 is a wire routing representation. The wire routing indicates how wire extends within and through these second and third arms 26, 27 from the awning roller assembly 30 (FIG. 1) to the first arm 24 at the fixed wall where the awning assembly 20 is mounted. In one embodiment, the wire routing may extend upwardly from an upper end of the first arm 24 and in an alternate embodiment, the wire routing may extend toward a lower end of the first arm 24. However, in either case, the wire routing extends through, or within, the hardware 28 so as to be hidden and also to preclude binding of the wire during extension or retraction of the awning canopy 22 (FIG. 1). A circuit including a switch may be in electrical communication with the wire routing in order to extend or retract the awning. Additionally, a switch may be provided to power the luminaires described herein.

The arms of hardware assembly 28 may have various cross-sectional shapes. For example, the cross-sectional shapes may be closed such as rectangular, circular or square shaped. Alternatively, the hardware arms may be open cross-sectioned such as U-shaped.

Figure 3:
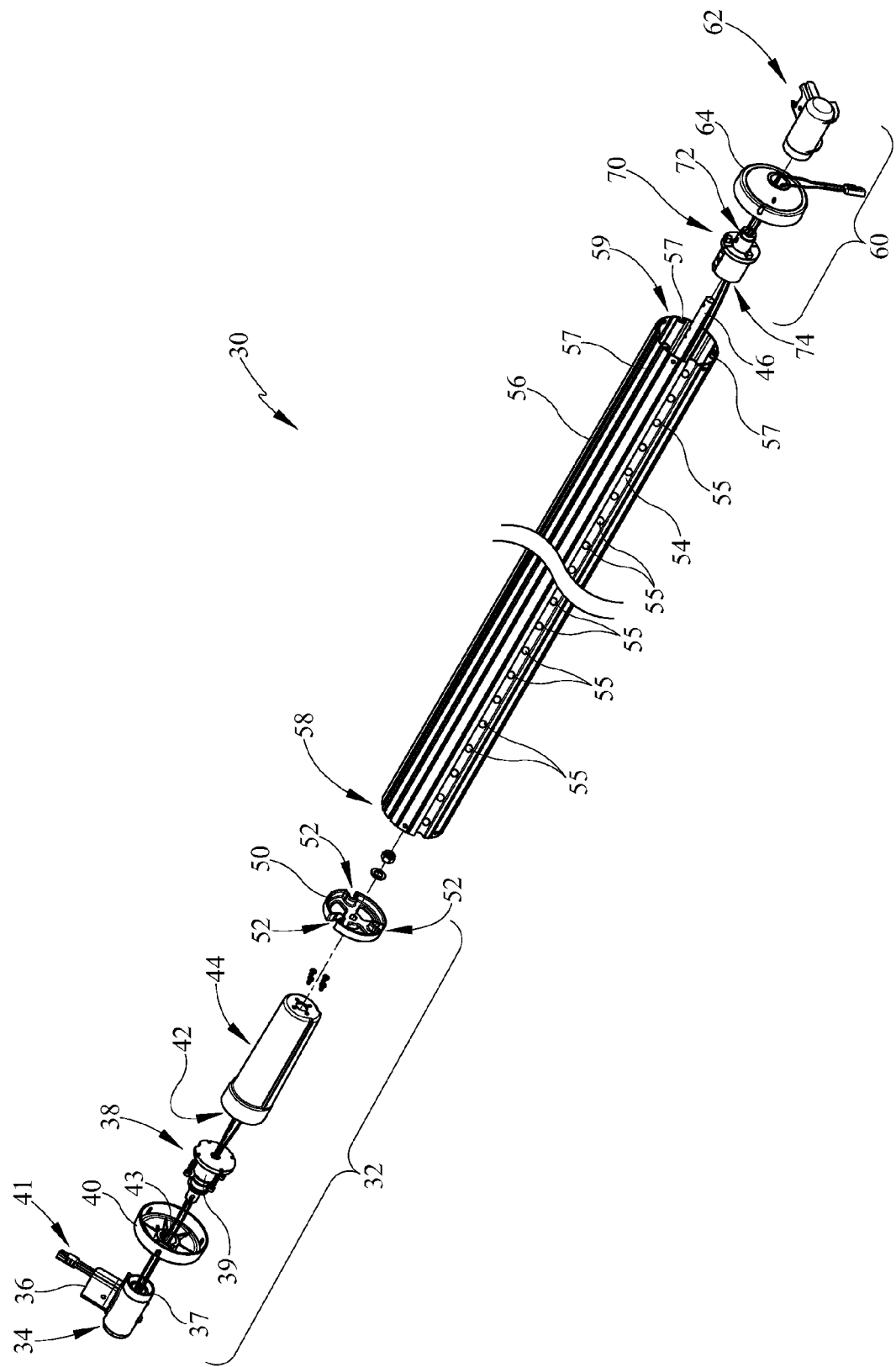
FIG. 3 is an exploded isometric view of an awning roller tube including an electromechanical rotating conductor.

Referring now to FIG. 3, an exploded isometric view of an awning roller tube assembly 30 is depicted. Starting at the left hand end of the figure, a first torsion assembly 32 is depicted. The first torsion assembly 32 includes a top casting 34 which is connected to the awning hardware 28 (FIG. 1). The top casting 34 includes a first end 36 which is coupled to the awning hardware 28 and extends or retracts from the sidewall of the RV, boat or other fixed structure to which the awning is connected. The top casting 34 is fixed and allows for rotation of the awning roller tube 30.

A second end 37 of the top casting 34 includes a pivoting connection 38 which may extend through the end cap 40. The pivoting connection 38 connects to the motor housing 44 and allows limited movement of the top casting 36 with respect to the motor housing 44 by allowing pivoting of the awning roller tube. More specifically, the angle of the major axis of the awning tube 56 may vary at the pivoting connection 38 thereby allowing relative movement between the pivoting connection 38, awning tube 56 and the top casting 34.

The pivoting connection 38 provides an additional function beyond providing for angular motion of the awning roller tube 56 relative to the top casting 34. The pivoting connection 38 provides a bushing surface 39 upon which an end cap 40 may rotate. The end cap 40 includes a central opening through which the pivoting connection 38 passes so that the end cap 40 is captured between the top casting 34 and the pivoting connection 38 and the end cap 40 may rotate freely thereon with rotation of the awning roller tube 56. According to some embodiments, the top casting 34 is generally fixed and the pivoting connection 38 allows for angular displacement of the awning roller tube 56 as well as provides a surface for rotation of the end cap 40.

A quick disconnect connector 41 is shown extending from the top casting 34. The quick disconnect connector 41 passes from the first end 36 and wires extend through the top casting 34, end cap 40 and pivoting connection 38 to the motor housing 44 to power a motor 42 located within a motor housing 44. In the opposite direction, the connector 41 connects to wires which extend through the hardware 28. In this way, the wires are hidden.

The motor housing 44 includes an aperture through which a motor shaft may extend and be connected to a drive disc 50. The drive disc 50 is connected to the roller tube 56 so that when the motor 42 rotates the drive disc 50, the roller tube 56 rotates with the drive disc 50. While the housing 44 is fixed in the instant embodiment, the awning tube 56 rotates causing the end cap 40 to rotate on the surface 39 of the pivoting connection 38. Alternatively, the housing 44 may rotate and be connected to, so as to cause rotation of the drive disc 50. The drive disc 50 may be located along the inner periphery of the roller tube 56 or may be connected to the outer edge of the roller tube 56. Further, this is merely one structure for rotating the roller tube 56 and other methods may be utilized.

The roller tube 56 is generally cylindrical in shape, having a plurality of axial grooves 57 therein. The roller tube 56 includes a first end 58 which engages the drive disc 50 and a second end 59 opposite the first end. One or more of the plurality of axial grooves 57 engage correspondingly sized receivers 52 in the drive disc 50. These grooves or teeth 57 engage the receivers 52 to allow for torque transfer from the motor 42 and drive disc 50 to the roller tube 56 causing rotation of the roller tube 56.

At the second end 59 of the roller tube 56 is a second torsion assembly 60. The assembly 60 includes a top casting 62, end cap 64 and a rotating electromechanical conductor 70. Referring first to the top casting 62, the structure is similar to top casting 34 in that it provides a point of connection for the roller tube assembly 30 to connect to the hardware 28 extending from the RV, boat or fixed structure. The second end cap 64 is pivotally connected to the top casting 62 and engages the second end 59 of the roller tube 56. The end cap 64 also receives one end of the rotating conductor 70. The rotating conductor 70 is electromechanical and allows an electrical connection between a fixed component at one end of the top casting 62 and a rotating component at the end 59 of awning tube 56. The electromechanical rotating conductor 70 includes a first end defined by an inner bushing 72 which is connected to the torsion rod 46. The second end or external bushing 74 engages the end cap 64 and rotates with the end cap 64 and roller tube 56. In the instant embodiment, an inner bushing 72 extends from the outer bushing 74.

A rod 46 extends through the roller tube and a torsion spring (not shown) is located on the rod 46 to bias the awning roller tube assembly 30. This keeps the canopy 22 tight on the roller tube 56. The rod 46 is connected to the inner bushing 72 of the rotating conductor 70 and a fastener or clip may be utilized to extend through the bushing into the rod for torsional transmission.

The roller tube 56 includes at least one axial light groove 54 wherein a plurality of luminaires 55 may be utilized. The groove 54 may include LED luminaires for example, or other low voltage luminaires. It is desirable that in the fully extended awning position, the light groove 54 be directed downwardly to illuminate under the canopy 22. The LEDs 55 may be located on printed circuit boards which are located either in the groove 54 or inside the tube 56 so that the LEDs 55 extend into the groove 54 from the tube interior through holes. The groove 54 may extend the entire length of the tube 56, or may extend some axial length less than the length of the tube 56. The tube 56 may have multiple grooves 54 along the axial length of the tube 56 and one or more grooves 54 spaced apart circumferentially. Additionally, the groove 54 may include a reflector therein and a lens over groove 54.

Figure 4:
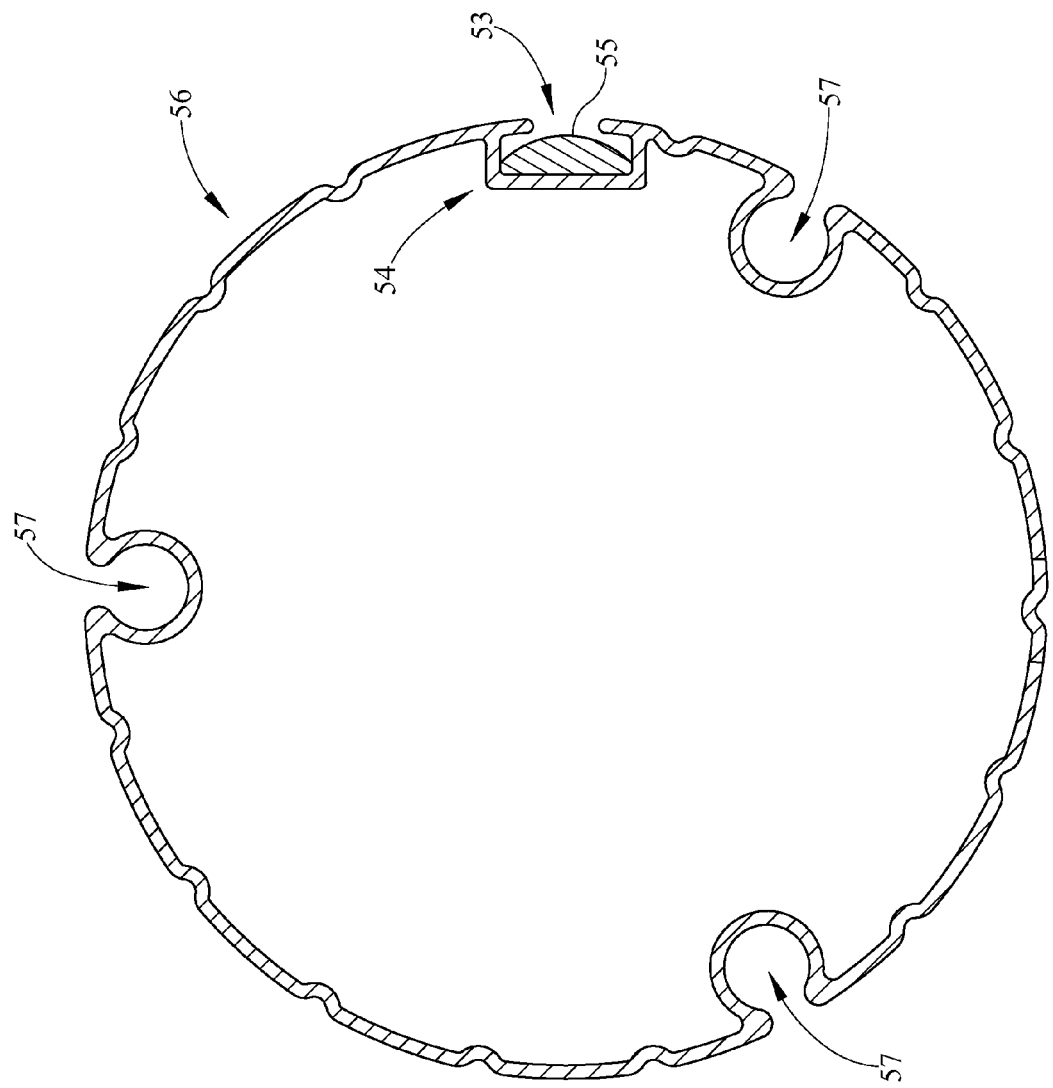
FIG. 4 is a side section view of an exemplary roller tube including luminaries therein.

Referring now to FIG. 4, a side section view of the roller tube 56 is depicted wherein the plurality of grooves 57 are shown. The grooves 57 allow for receiving of a retaining structure to hold the awning, as well as engaging the drive disc 50 on the interior of the roller tube 56 and thereby causing rotation of the roller tube 56. Located along the interior surface of the roller tube 56 is the groove 54 wherein the plurality of luminaires 55 may be located. According to some embodiments, the luminaires 55 may be LED assemblies including a bulb and a printed circuited board for driving the LED lamp. The luminaire 55 may alternatively comprise various forms. For example, the printed circuit board may be located on the interior side of the groove structure 54 (within tube 56) so that the luminaire 55 extends through the interior wall of the groove 54 and into an opening 53 such that light can shine out from the roller tube 56. Alternatively, the luminaire 55 may be located within the groove 54 as depicted. Various embodiments may be utilized and therefore, the construction should not be a limiting one.

Figure 5:
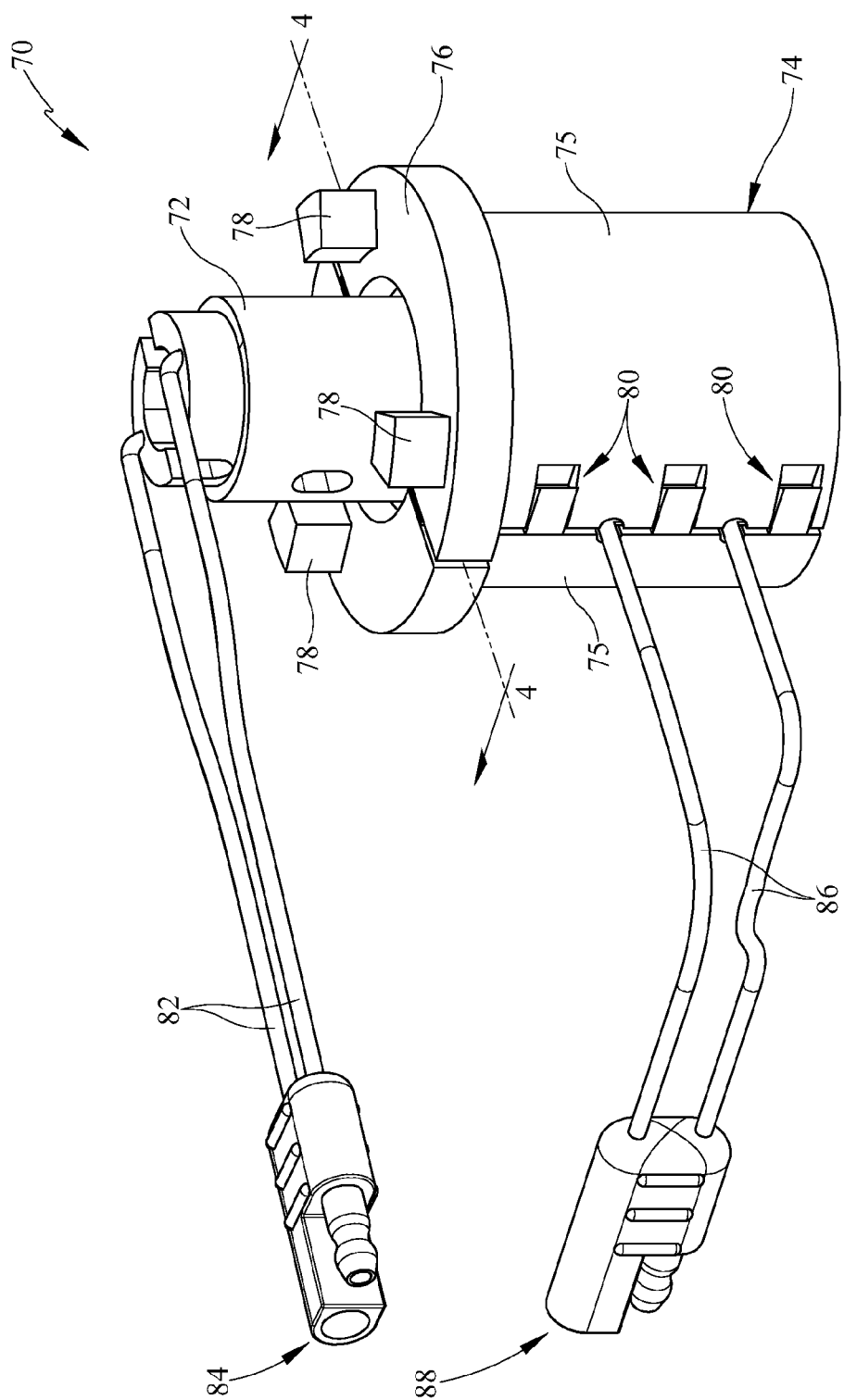
FIG. 5 is an isometric view of the assembled rotating conductor.

Referring now to FIG. 5, an isometric view of the rotating conductor 70 is depicted. The conductor 70 is formed of an inner bushing 72 which in the embodiment is fixed and an outer bushing 74 which rotates about the inner bushing. In alternative embodiments, the outer bushing 74 may be fixed however, and the inner bushing 72 may rotate. The outer bushing 74 may include a flange 76 and at least one protrusion 78 that extends axially and which engages the second end cap 64 (FIG. 3) causing rotation of the outer bushing 74. In the orientation depicted, the flange 76 is located at an end of the outer bushing 74, although according to other embodiments, the flange 76 may be moved axially to various locations along the outer bushing. Further, and with brief reference to FIG. 9, protuberances 178 may extend in a direction other than axial, as in the previous embodiment. For example, the instant embodiment includes protuberances 178 that extend in a radial direction. In this manner, the protuberances 178 may engage awning roller tube 56 such that rotation of the awning roller tube 56 causes rotation of the outer bushing 74. The protuberances 178 may extend from a flange or other extending feature 179 so that the protuberances extend radially from the rotating conductor 70 to engage the roller tube 56. Still further, the at least one protrusion 78, 178 is depicted as three structures which are separated generally by about 120 degrees. However, various shapes may be utilized and various alternative spacing may also be utilized. Alternately, the outer bushing 74 may be allowed to rotate freely or be indirectly driven through tension forces applied, for example by the conductors 86.

Referring again to FIG. 5, the outer bushing 74 may be formed of two semi-circular halves 75 which are snapped together by a plurality of tabs and catches 80. Other embodiments for connecting the portions 75 of the outer bushing 74 include, but are not limited to, fasteners, adhesives, or permanent bonding. Further, while the instant embodiment provides two portions or sections 75 that are placed together to form the outer bushing 74, alternatively, a single outer bushing housing may be utilized or more than two housing structures or sections may be utilized. The outer bushing 74 may include conductor holes to allow pass through of conductors 86. Similarly, the inner bushing 72 also provides for two or more wires 82 to pass therefrom. In the instant embodiment, the wires 82 extend from the upper or axial end of the inner bushing 72 so that the wires can pass through the second end cap 64.

The rotating conductor assembly 70 includes a first pair of conductors 82 extending from the inner bushing 72 and having a quick disconnect 84 at one end thereof. The conductors 82 and quick disconnect 84 extend from the rotating conductor 70 toward the vehicle or fixed structure to which the awning assembly 30 is connected. A connecting wire in communication with wires 82 may be routed through hardware. This eliminates the need to run the wires through an awning hem. Extending from the outer bushing 74 is a second pair of conductors 86 and a quick disconnect 88. These conductors 86 and quick disconnect 88 provide power to the luminaires 55 (FIG. 3) located in the awning roller tube 56. For example, a wiring harness may be utilized to extend from the connector 88 to the luminaires located in the roller tube 56 in order to provide power during operation for such luminaires. Additionally, the wires 82 exit the inner bushing 72 and pass through end cap 64 (FIG. 3) with the inner bushing 72. Since the inner bushing 72 is not rotating in the instant embodiment, the wires 82 are not moving with rotation of the awning and the wires 82 and connector 84 may be connected to a power source from the RV, and which may extend through the hardware 28 (FIG. 1).

Also, in this view, one skilled in the art will understand that the outer bushing 74 rotates when the inner bushing 72 is fixed and provides an axis about which the outer bushing 74 may rotate. During rotation of the roller tube 56, the protrusions 78 cause the outer bushing 74 to rotate with the end cap 64 which is fixed to the second end 59 of the roller tube 56.

Figure 6:
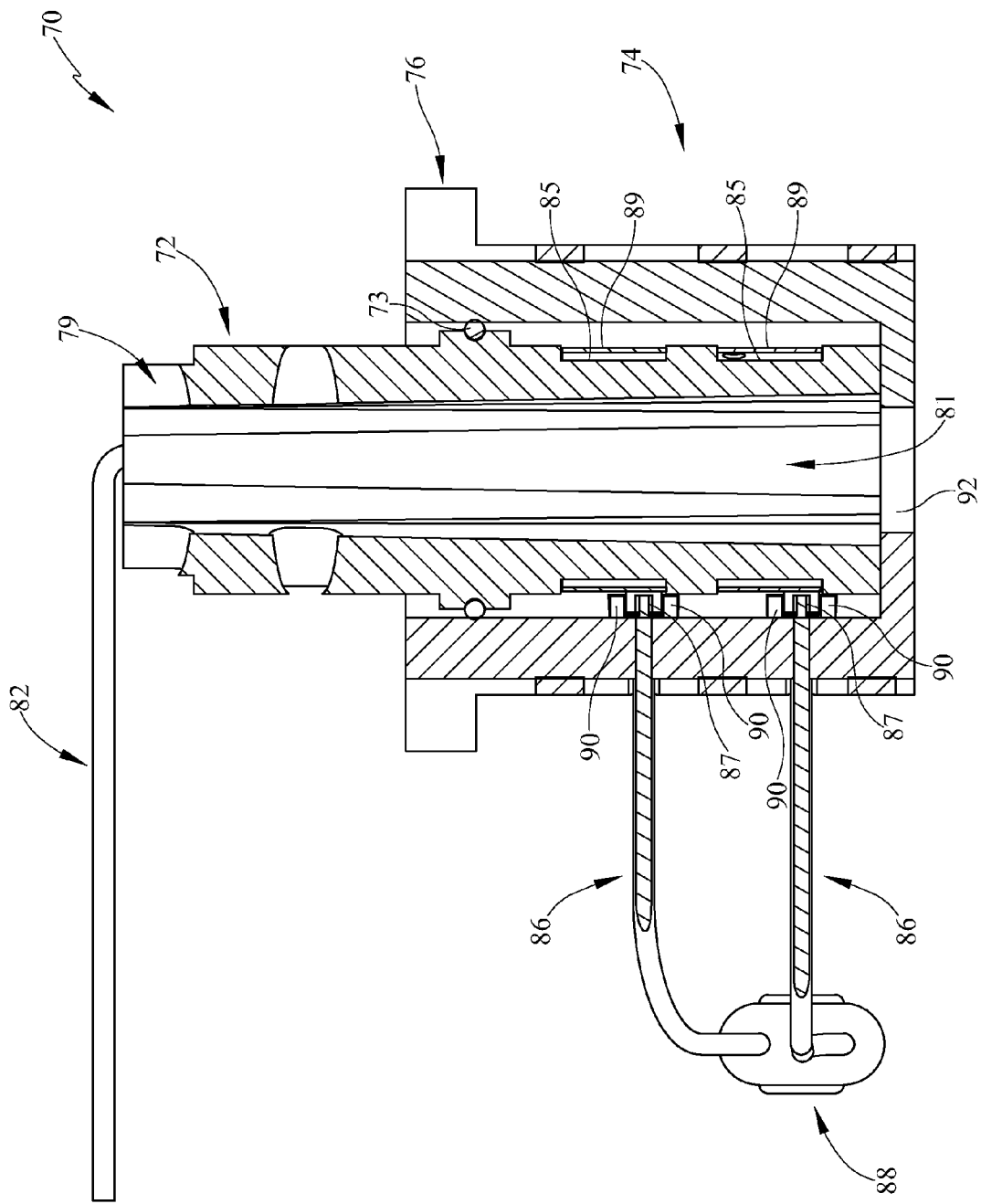
FIG. 6 is a side-section view of the conductor of FIG. 5.

Referring now to FIG. 6, a section view of the rotating conductor 70 is depicted. The rotating conductor 70 is electromechanical and provides electrical connection across a rotating joint between a fixed part, the top casting 62 (FIG. 3), and a rotating part, the awning roller tube 56. The inner bushing 72 is substantially cylindrical in shape and is formed with various steps and/or grooves therein. As depicted in the view, conductors 86 are electrically connected to brushes 87 which rotate about the inner bushing 72 with the outer bushing 74. The inner bushing 72 includes grooves 85 having conductive strips 89 which are engaged by the brushes 87 to transfer electricity across the rotating joint. Specifically, electricity is transferred between the rotating outer bushing 74 and the fixed inner bushing 72. The inner bushing 72 also comprises an o-ring 73 which is seated between the inner bushing 72 and outer bushing 74, providing a seal therebetween and inhibiting moisture or other contaminants from entering the area where the brushes 87 and the conductive strips 89 are located. The inner bushing 72 also includes a hollow passage 81 which may be tapered from one side to the other in an axial direction causing frictional engagement with rod 46 (FIG. 3).

Figure 7:
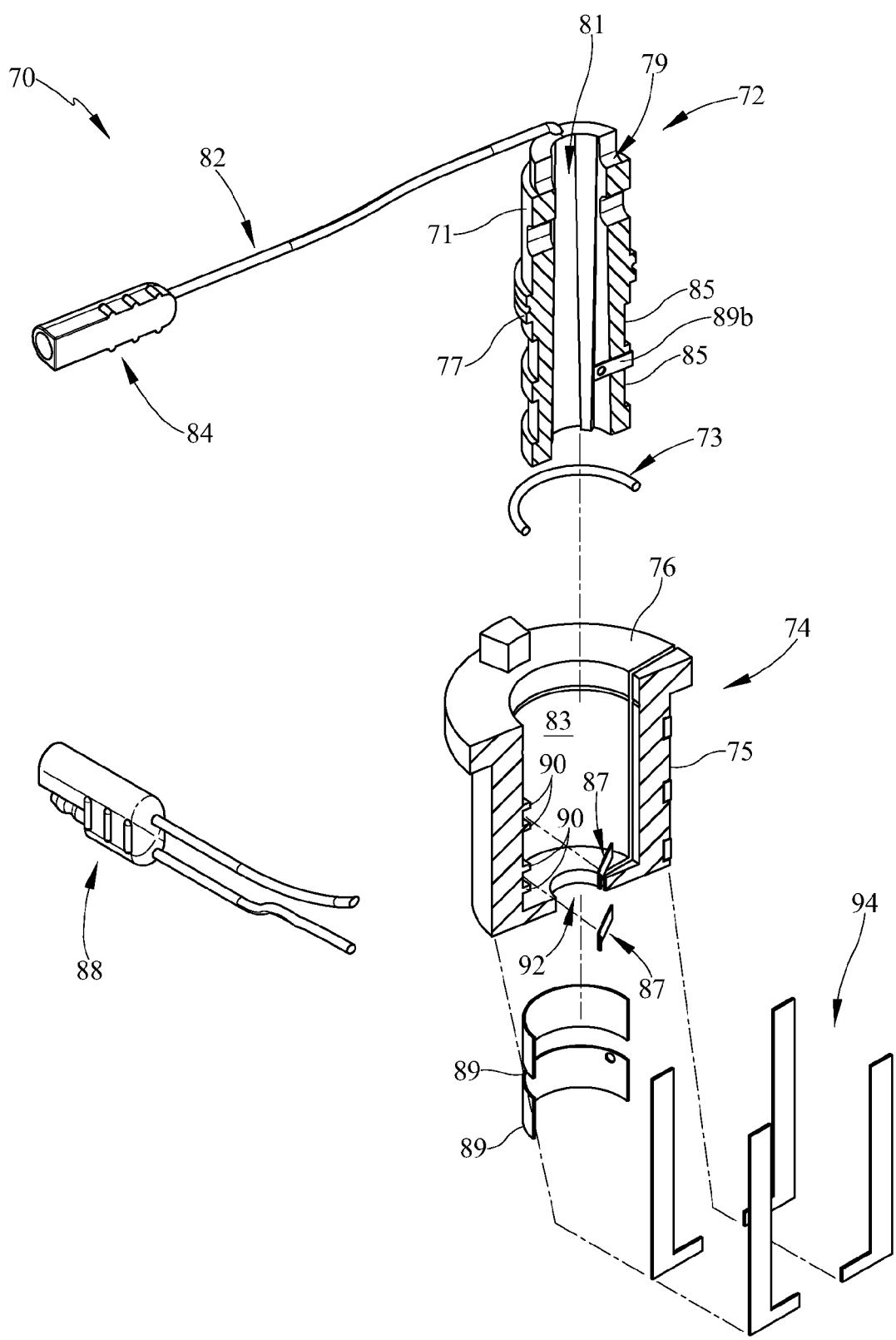
FIG. 7 is an exploded isometric section view of an exemplary rotating conductor.

Referring now to FIG. 7, a sectioned conductor 70 of FIG. 6 is exploded to better describe the parts and clarify operation. Starting at the upper end of the rotating conductor 70, the inner bushing 72 is depicted including an outer surface 71 and seal landing 77 including a groove wherein the o-ring 73 is located. Beneath the landing 77 are grooves 85 which receive the conductive strips or rings 89. The conductive strips 89 extend circumferentially about the inner housing and within the grooves 85 providing a location for contact with the brushes 87.

The conductors 82 and quick disconnect 84 extend from an upper edge of the inner bushing 72. The conductor 82 is in electrical communication with the conductive strips 89 mounted within the grooves 85. More specifically, the wires 82 enter the top of the inner bushing 72 and travel interior to the walls of the inner bushing 72 until just above each conductor ring 89. The wires 82 then exit the inner bushing 72 and are folded down to contact the conductor ring or strip 89 between the surfaces of the conductor ring 89 and the outer housing 76. A metallic conductor 89*b* may be used to connect the wires 82 to the strip 89, for example. The wire 82 is then secured with a screw which is also used to secure the conductor 89.

The upper end of the inner bushing 72 includes a groove 79 which receives a pin or other fastener to connect the inner bushing to the rod 46 (FIG. 3). The rod 46 is inserted into the lower open end of the inner bushing 72 and extends to the upper end where a pin or other fastening connection is made through the groove 79 and through a hole in the rod 46 in the depicted orientation.

Beneath the inner bushing 72 is the outer bushing 74. The outer bushing 74 is generally cylindrically shaped with the upper flange 76 and an interior defined by inner surface 83 wherein the inner bushing 72 may be positioned. The inner surface 83 includes a pair of guides or spacers 90 defining a space wherein the brushes 87 are located. As shown more clearly in FIG. 6, the spacers 90 locate the inner bushing 72 within the outer bushing 74. The brushes 87 extend into the opening of the outer bushing 74 to engage the conductor rings 89 as described previously. The outer bushing 74 includes a rod aperture 92 located at the bottom surface thereof allowing passage of the rod 46 into the outer bushing 74 and into the inner bushing 72.

The conductor assembly 70 also comprises seals 94 which are shown as L-shaped structures. The seals 94 are located between halves 75 of the outer bushing 74. The seals inhibit water or other contaminants from entering between the sections or portions 75 defining the outer bushing 74. One pair of seals 94 is provided for each bushing half 75. Alternate constructions should be considered within the scope of the present disclosure. For example, as the sealing structure may alternatively include hermetic welding or other combinations of sealing material to perform the same function.

Figure 8:
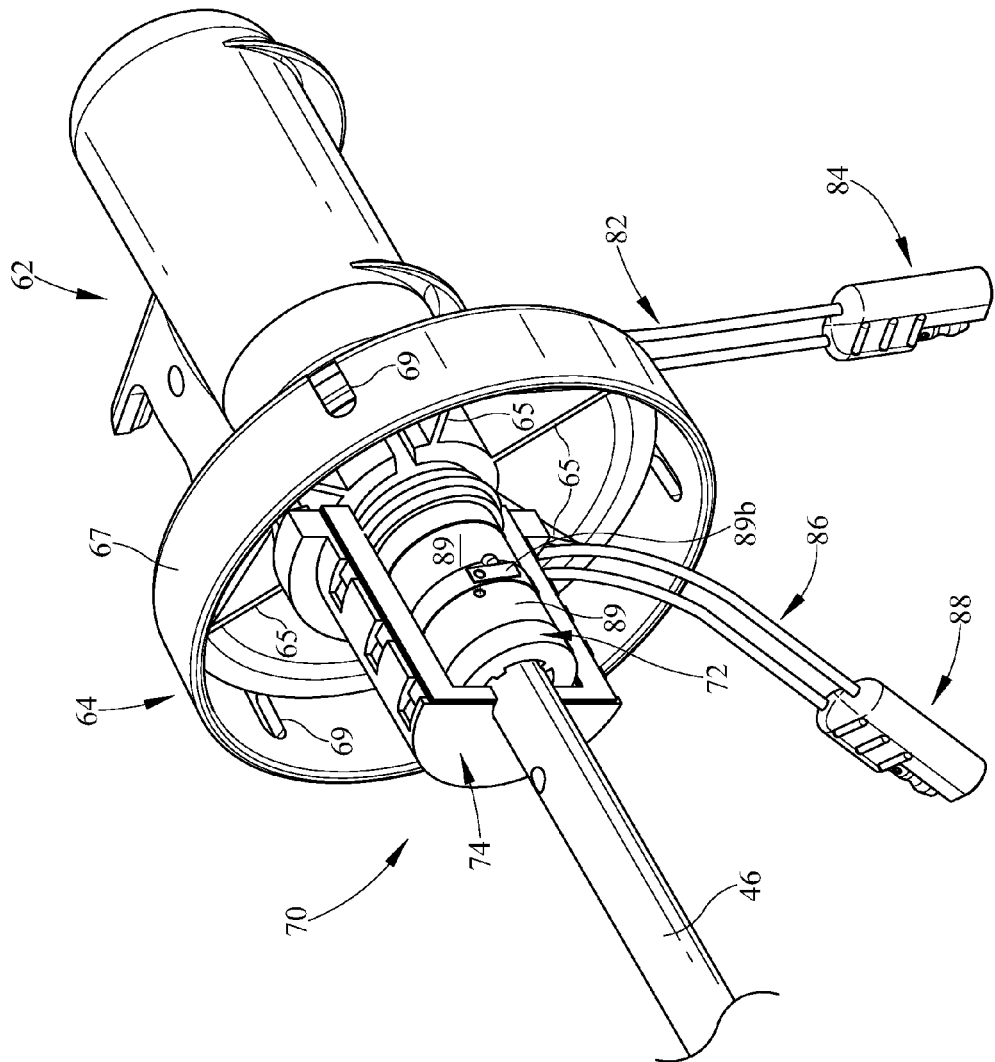
FIG. 8 is an isometric view of the rotating conductor assembled in a portion of the torsion assembly
Figure 9:
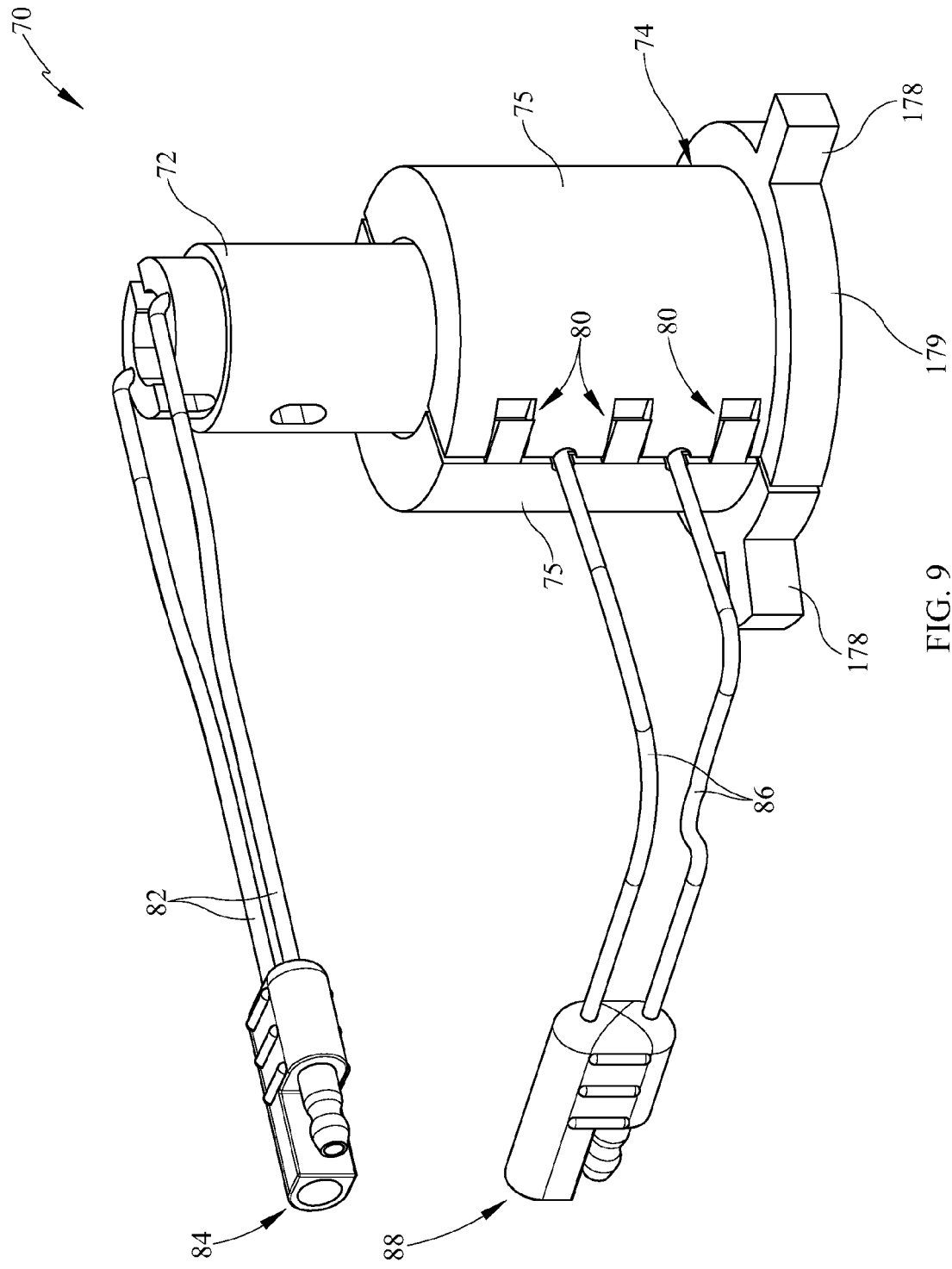
FIG. 9 is an isometric view of an alternate embodiment of the rotatable conductor; and, FIG. 10 is an isometric view of a further alternate embodiment of the rotatable conductor.

Referring now to FIG. 8, an isometric view of the second end cap 64 and second top casting 62 is shown in engagement with the rotating conductor 70. The top casting 62 is connected to the torsion rod 46 such that the top casting 62 is fixed and the end cap 64 rotates about the torsion rod 46 with the outer bushing 74 of the rotating conductor 70. To provide such motion, a plurality of ribs 65 are shown extending radially on the inner surface of the end cap 64. The ribs 65 are engaged by the protuberance or tooth 78 (FIG. 5). As previously discussed, the end cap 64 is connected to the second end 59 of the roller tube 56. Thus, as the roller tube 56 rotates, it drives the end cap 64 to revolve about the torsion rod 46, which then drives the outer bushing 74 to rotate through engagement between the protuberances 78 and the ribs 65. Likewise, similar function could be attained by designing the outer bushing 74 in such a way that it engages one or more of the plurality of axial channels 57 (FIG. 3). In further alternatives, the outer bushing 74 may be driven by friction engagement with a rotating part to effect the desired rotation.

The end cap 64 further comprises a flange 67 including a plurality of fastening apertures 69. These apertures allow for connection of the end cap 64 to the second end 59 of the roller tube 56.

The rotating conductor 70 is shown with a portion of the outer bushing 74 removed which reveals the inner bushing 72. The conductive rings or strips 89 are located within grooves along the inner bushing 72. The awning rod 46 is shown extending into and through the outer bushing 74 and into the inner bushing 72 in an axial direction and extending toward the second top casting 62 in an axial direction.

The flange 67 may further comprise a notch wherein conductors 86 may pass through or alternatively, the conductors 86 may be retained within the end cap 64 and extend into the awning tube 56 for connection to the luminaires. For example, an alternative connector may be connected to connector 88 which provides the wires in electrical connection with the luminaires.

Figure 10:
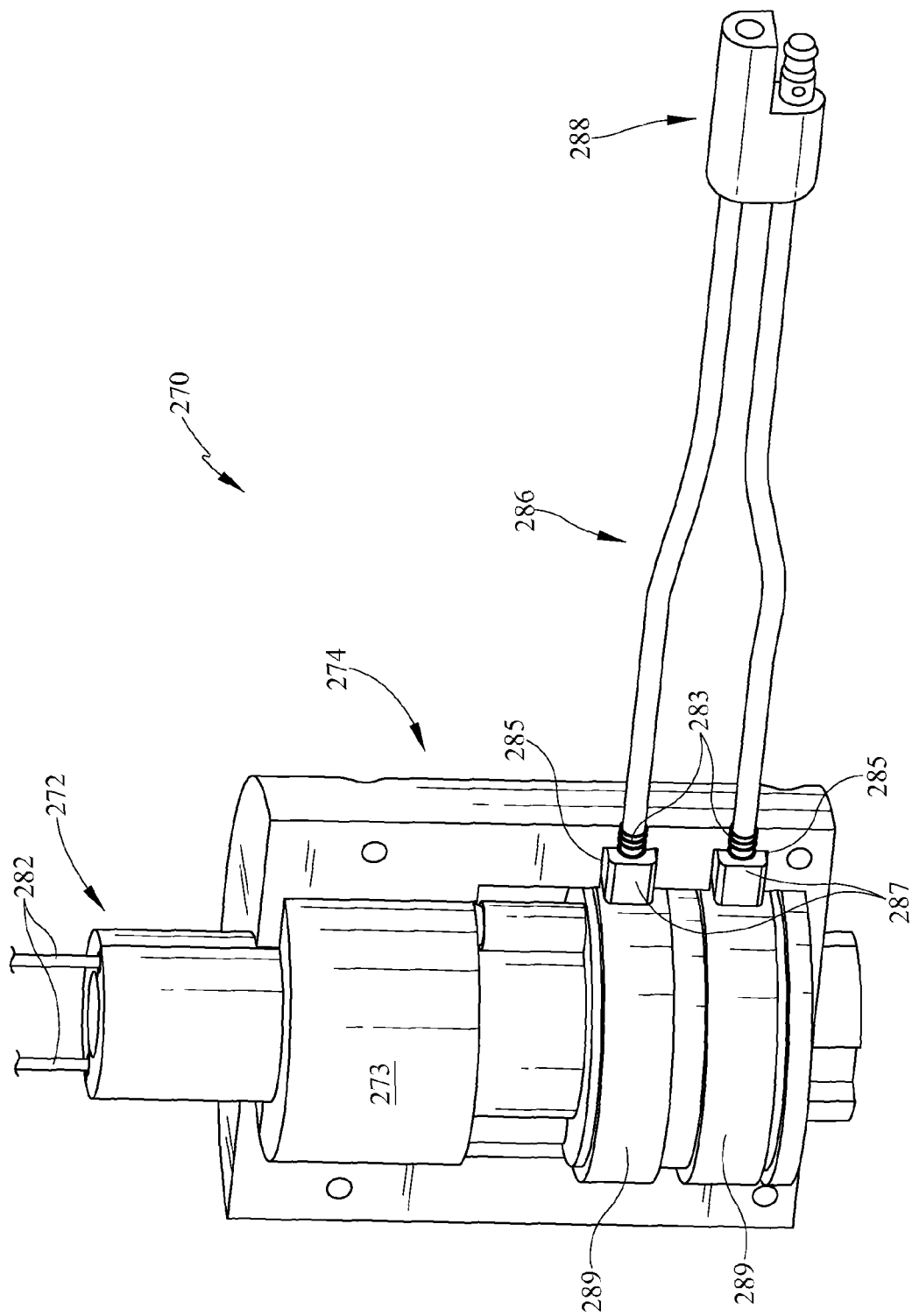

Referring now to FIG. 10, an alternate embodiment of the rotatable conductor 270 is depicted wherein an inner bushing 272 and an outer bushing 274 are mounted coaxially to provide electrical communication through a rotating joint. The isometric view is shown with a portion of the outer bushing removed so as to reveal the inner bushing 272 positioned therein. The inner bushing 272 is one molded piece. The inner bushing 272 includes conductive strips 289 with opposite brushes 287 located within pockets 285 of the outer bushing 274. The brushes 287 are connected to wires 286 and a quick connector 288 for electrical communication with the brushes 287 and contact with the conductive strips 289. The brushes 287 are engaged by brush springs 283 which are seated within the outer bushing 274 and urge the brushes 287 into contact with the conductive strips 289. The brush springs 283 may also function as stress reliefs for the wires 286 extending from the brushes 287. The outer bushing 274 may be of substantially constant interior diameter for the opening, wherein the inner bushing 272 is positioned or alternatively, may be of various interior diameters. For example, in the depicted embodiment a guide 273 is utilized near the upper end of the inner bushing 272. This functions as a seat against the smaller diameter of the outer bushing 274 in the upper end of the outer bushing 274. Below the guide 273, the interior diameter of the outer bushing 274 increases allowing space for the strips 289 and some limited movement of the brushes 287.

The upper end of the inner bushing 272 includes two apertures where wires 282 may extend from for completing the circuit and moving through the conductor 270 to provide electrical communication through or across a rotating joint. Accordingly, in this embodiment, the use of the screws to connect brushes 287, as in previous embodiments, or for connecting wires 282 to the inner strips 289 is no longer necessary.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A rotating conductor assembly, comprising:
an outer bushing and an inner bushing;
said outer bushing in rotating electrical communication with said inner bushing;
one of said outer bushing or said inner bushing having brushes and the other of said inner bushing or outer bushing having conductor rings;
wherein said one of said outer bushing or said inner bushing rotates relative to the other of said outer bushing or said inner bushing;
an awning roller tube which rotates with said one of said outer bushing or said inner bushing, said inner bushing being disposed radially inwardly of said outer bushing;
an axial groove in said awning roller tube wherein a power is provided at said axial groove through said rotating conductor assembly;
said inner bushing engaging one of a torsion rod or said awning roller tube; and,
said outer bushing engaging one of said awning roller tube or an end cap.

2. The rotating conductor assembly of claim 1, said outer bushing and said inner bushing at least partially disposed within said awning roller tube.

3. The rotating conductor assembly of claim 1 further comprising a protuberance extending from said rotatable conductor.

4. The rotating conductor assembly of claim 3, further comprising a flange, wherein said protuberance extends from said flange.

5. The rotating conductor assembly of claim 3, said protuberance engaging said end cap.

6. The rotating conductor assembly of claim 3, said protuberance engaging an interior of said awning roller tube.

7. A rotating conductor assembly for an awning assembly, comprising:
an awning drive assembly including a motor, a drive operably connected to said motor which rotatably drives an awning roller tube;
a rotating conductor at least partially disposed within said awning roller tube; said rotating conductor having at least one inner bushing and at least one outer bushing wherein one of said inner bushing or said outer bushing rotates relative to the other of said inner bushing or said outer bushing and said inner bushing is disposed within said outer bushing;
said rotating conductor having one pair of electrical brushes and one pair of conductor rings to provide electrical communication across said inner and outer bushings during rotation of said awning roller tube;
said awning roller tube having an axial groove wherein electrical power from said rotating conductor is provided.

8. The rotating conductor assembly for an awning assembly of claim 7 further comprising a plurality of luminaires in said groove.

9. The rotating conductor assembly for an awning assembly of claim 7, said rotating conductor engaging either said awning roller tube or an and cap.

10. The rotating conductor assembly for an awning assembly of claim 9 further comprising a protuberance engaging either said awning roller tube or said and cap.

11. The rotating conductor assembly for an awning assembly of claim 10, said protuberance extending from a flange.

12. A rotatable conductor assembly for an awning, comprising;
an awning assembly including an awning roller tube;
a rotating conductor having an inner bushing disposed within an outer bushing, said rotating conductor having a fixed portion and a rotating portion;
electrical communication between said fixed portion and said rotating portion during rotation of said awning roller tube; and,
at least one electrical wiring providing electrical power to said rotating conductor and at least one second electrical wire extending from said rotating conductor and providing power within an axial groove in said awning roller tube.

13. The rotatable conductor assembly of claim 12 further comprising a plurality of protuberances.

14. The rotatable conductor assembly of claim 13 further comprising a flange, said plurality of protuberances extending from said flange.

15. The rotatable conductor assembly of claim 13, said protuberances capable of engaging either said awning roller tube or an end cap.

16. The rotatable conductor of claim 12, said fixed portion operably engaging a torsion assembly and said rotating portion operably engaging either said awning roller tube or an end cap.

* * * * *